(12) United States Patent
Hwang et al.

(10) Patent No.: US 9,804,443 B2
(45) Date of Patent: Oct. 31, 2017

(54) LIGHT SOURCE UNIT FIXING REFLECTION SHEET AND DISPLAY APPARATUS INCLUDING THE SAME

(71) Applicant: Samsung Display Co., Ltd., Yongin-Si, Gyeonggi-Do (KR)

(72) Inventors: Seong-yong Hwang, Hwaseong-si (KR); Byung-seo Yoon, Hwaseong-si (KR); Yong-hwi Kim, Asan-si (KR); Minjeong Kim, Asan-si (KR); Hyunjin Maeng, Seoul (KR); Kisoo Park, Cheonan-si (KR); Soonick Jang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 65 days.

(21) Appl. No.: 15/049,217

(22) Filed: Feb. 22, 2016

(65) Prior Publication Data

US 2016/0370652 A1    Dec. 22, 2016

(30) Foreign Application Priority Data

Jun. 16, 2015  (KR) .................. 10-2015-0085337

(51) Int. Cl.
*G09F 13/04* (2006.01)
*G09F 13/08* (2006.01)
*G02F 1/1335* (2006.01)

(52) U.S. Cl.
CPC .. *G02F 1/133605* (2013.01); *G02F 1/133606* (2013.01); *G02F 1/133603* (2013.01); *G02F 2001/133607* (2013.01)

(58) Field of Classification Search
CPC ......... G02F 1/133603; G02F 1/133605; G02F 1/133606; G02F 2001/133607
USPC ................................................. 362/97.1–97.4
See application file for complete search history.

(56) References Cited

U.S. PATENT DOCUMENTS

| | | | |
|---|---|---|---|
| 8,941,796 | B2 | 1/2015 | Yokota |
| 2014/0301085 | A1 | 10/2014 | Hwang et al. |
| 2015/0219286 | A1 | 8/2015 | Yoon et al. |

FOREIGN PATENT DOCUMENTS

| | | |
|---|---|---|
| JP | 2009-087879 A | 4/2009 |
| JP | 2013-225520 A | 10/2013 |
| KR | 1020130003400 A | 1/2013 |
| KR | 1020150092429 A | 8/2015 |
| KR | 1020160117697 A | 10/2016 |

*Primary Examiner* — Jason Moon Han
(74) *Attorney, Agent, or Firm* — Cantor Colburn LLP (57) ABSTRACT

A display apparatus includes plural light source units each including a light emitting device and a lens portion; a reflection sheet defining plural holes thereof and into which the light source units are respectively disposed; and a display panel on the reflection sheet. The lens portion defines: a body portion; and plural side protruding portions and respectively at opposing sides of the body portion in a first direction in a top plan view. The hole of the reflection sheet is defined by: an edge of a first hole; an edge of a second hole facing the first hole in a second direction crossing the first direction, the second hole larger than the first hole; and slanted edges connecting the first hole to the second hole. In a fixed state of the reflection sheet, a predetermined area of the reflection sheet adjacent to the slanted edges overlaps the side protruding portions.

19 Claims, 11 Drawing Sheets

LIGHT SOURCE UNIT FIXING REFLECTION SHEET AND DISPLAY APPARATUS INCLUDING THE SAME

This application claims priority to Korean Patent Application No. 10-2015-0085337, filed on Jun. 16, 2015, and all the benefits accruing therefrom under 35 U.S.C. §119, the entire contents of which are hereby incorporated by reference.

BACKGROUND (1) Field

The invention disclosed herein relates to a display apparatus, and more particularly, to a display apparatus which prevents detachment of a reflection sheet therein.

(2) Description of the Related Art

In general, a display apparatus includes a display panel which displays an image and a backlight unit which provides light to the display panel. The display panel includes a first display substrate in which a plurality of pixels is disposed, a second display substrate facing the first display substrate, and an image display layer interposed between the first and second display substrates.

The image display layer is driven by the pixels, and the transmittance through the display panel of light provided from the backlight unit is adjusted by the image display layer to display an image. The image display layer may be a liquid crystal layer, an electrowetting layer or an electrophoretic layer.

The backlight unit may be classified as an edge-type backlight unit disposed on a side of the display panel to generate light or a direct-type backlight unit disposed under the display panel to generate light.

The direct-type backlight unit includes a reflection sheet in which a plurality of holes is defined, and light source units which generate light. The light sources extend into the holes of the reflection sheet and are greater in cross-sectional thickness than the reflection sheet. In the direct-type backlight unit, the light sources emit light in an upward direction toward the display panel, and the reflection sheet reflects light initially emitted toward a rear side of the light sources to direct the light in the upward direction.

SUMMARY

One or more exemplary embodiment of the invention provides a display apparatus which prevent detachment of a reflection sheet therein.

An exemplary embodiment provides a display apparatus including a light source unit provided in plural and including a light emitting device which generates light and a lens portion which is on the light emitting device and emits the light; a reflection sheet defining a hole thereof provided in plural and in which the light source unit is disposed; and a display panel which is disposed on the reflection sheet and displays an image with the light emitted by the light source unit. The lens portion defines: a body portion thereof on the light emitting device; and a first side protruding portion thereof provided in plural and respectively disposed at opposing sides of the body portion in a first direction to protrude from the body portion along the first direction in a top plan view. The hole of the reflection sheet is defined by: an edge of a first hole; an edge of a second hole facing the first hole in a second direction crossing the first direction, the second hole larger than the first hole; and slanted edges which connect an upper portion of the first hole to a lower portion of the second hole. In a fixed state of the reflection sheet, a predetermined area of the reflection sheet which is adjacent to the slanted edges overlaps the first side protruding portions of the lens portion.

In an exemplary embodiment, the lens portion may further define: a lower protruding portion thereof respectively disposed below each of the first side protruding portions and protruding toward the reflection sheet; and a second side protruding portion thereof protruding from the body portion along the second direction in the top plan view.

In an exemplary embodiment, in the fixed state of the reflection sheet, the predetermined area of the reflection sheet which is adjacent to the slanted portions may be disposed to overlap the lower protruding portions.

In an exemplary embodiment, the first and second side protruding portions may be spaced a predetermined distance from a bottom surface of the body portion in a third direction perpendicular to both the first and second directions.

In an exemplary embodiment, the lower protruding portions may each be elongated in the first direction and have a convex shape defined in the second direction and a third direction perpendicular to both the first and second directions.

In an exemplary embodiment, the first and second side protruding portions may have a rectangular shape in the top plan view.

In an exemplary embodiment, the display apparatus may further include a light source substrate provided in plural and on which the light source units are mounted, the light source substrates elongated in the second direction and spaced apart from each other in the first direction; and a lower protection member defining a plurality of first grooves into which the light source substrates are disposed. In the fixed state of the reflection sheet, the predetermined area of the reflection sheet which is adjacent to the slanted edges may be disposed between the lower protruding portions of the lens portions and portions of the lower protection member which overlap the lower protruding portions in the top plan view.

In an exemplary embodiment, the lower protection member may define: a bottom portion thereof defining a top surface thereof from which the plurality of first grooves is recessed, and a sidewall portion extended from edges of the bottom portion. From the top surface of the bottom portion of the lower protection member, a height of a top surface of the reflection sheet may be equal to or less than that of a bottom surface of the first side protruding portions. A distance between a bottom surface of the lower protruding portions and the top surface of the bottom surface of the lower protection member may be less than a total thickness of the reflection sheet.

In an exemplary embodiment, the body portion may have a circular shape in the top plan view, a width of the light source substrate may be defined in the first direction, a maximum diameter of the body portion may define a first length in the first direction, a distance between distal ends of the first side protruding portions may define a second length in the first direction, the second length may be greater than the first length, and the first length may be greater than the width of the light source substrate in the first direction.

In an exemplary embodiment, the edge of first hole may define a concave shape protruded along the second direction, and the edge of the second hole may define a concave shape protruded along the second direction in a direction opposite to that of the concave shape of the first hole.

In an exemplary embodiment, in an un-fixed state of the reflection sheet, in the second direction in the top plan view, a lower side of the body portion and the second side protruding portion may overlap the first hole, and an upper side of the body portion opposite to that of the lower side thereof may overlap the second hole.

In an exemplary embodiment, in the top plan view, the concave shape of the edge of the first hole may be protruded from upper boundary points thereof disposed spaced apart from each other in the first direction, and a distance between the upper boundary points of the first hole defines a third length in the first direction, the concave shape of the edge of the second hole may be protruded from lower boundary points thereof disposed spaced apart from each other in the first direction, and a distance between the lower boundary points of the second hole defines a fourth length in the first direction, the third length may be greater than the first length, the second length may be greater than the third length, and the fourth length may be greater than the third length.

In an exemplary embodiment, the upper boundary points of the first hole and the lower boundary points of the second hole may be spaced a predetermined distance in the second direction, and the slanted edges may respectively connect an upper boundary point among the upper boundary points of the first hole to a lower boundary point among the lower boundary points of the second hole, which are adjacent to each other.

In an exemplary embodiment, the slanted edges which respectively connect the upper boundary points of the first hole to the lower boundary points of the second hole may be spaced apart from each other in the first direction and symmetric to each other in the first direction.

In an exemplary embodiment, each of the slanted edges may be inclined to form a predetermined angle with respect to the first direction.

In the plan view, among the slanted edges which respectively connect the upper boundary points of the first hole to the lower boundary points of the second hole and are spaced apart from each other in the first direction, a first slanted edge disposed on the left side of the hole may be inclined to form an angle greater than about 0° and less than about 30° in a counterclockwise direction from the first slanted edge to the first direction, and a second slanted edge disposed on the right side of the hole may be inclined surface to form an angle greater than about 0° and less than about 30° in a clockwise direction from the second slanted edge to the first direction.

In an exemplary embodiment, a maximum dimension of the hole in the second direction may define a fifth length, and the fifth length may be greater than a maximum distance between a distal end of the second side protruding portion and an outer edge of the body portion in the second direction.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Advantages and features of the invention, and implementation methods thereof will be clarified through the following exemplary embodiments described with reference to the accompanying drawings. The invention may, however, be embodied in different forms and should not be construed as limited to the exemplary embodiments set forth herein. Rather, these exemplary embodiments are provided so that this disclosure of the invention will be thorough and complete, and will fully convey the scope of the invention to those skilled in the art. Further, the invention is defined by scopes of claims. Like reference numerals refer to like elements throughout.

It will also be understood that when a layer is referred to as being "on" another layer or substrate, it can be directly on the other layer or substrate, or intervening layers may also be present. In contrast, when an element is referred to as being "directly on" another element or layer, there are no intervening elements or layers present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "below," "beneath," "lower" "above", "upper" and the like, may be used herein for ease of description to describe one element or feature's relationship to another element(s) or feature(s) as illustrated in the figures. The spatially relative terms should be understood as terms which include different directions of configurative elements in addition to directions illustrated in the figures when using or operating the invention.

It will be understood that although the terms, first and second are used herein to describe various elements, components, and/or sections, these elements, components and/or sections should not be limited by these terms. These terms are only used to distinguish one element, component, or section from another element, component, or section.

Accordingly, a first element, a first component, or a first section that will be described below may be a second element, a second component, or a second section within the technical idea of the embodiments of the invention.

The exemplary embodiments in the detailed description will be described with schematic cross-sectional views and/or plan views as ideal exemplary views of the invention. Accordingly, shapes of the exemplary views may be modified according to manufacturing techniques and/or allowable errors. Therefore, the exemplary embodiments of the invention are not limited to the specific shapes illustrated in the exemplary views, but may include other shapes that may be created according to manufacturing processes. Areas exemplified in the drawings have general properties, and are used to illustrate specific shapes of element regions. Thus, these should not be construed as being intended to limit the scope of the invention.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the invention will be described below in more detail with reference to the accompanying drawings.

Figure 1:
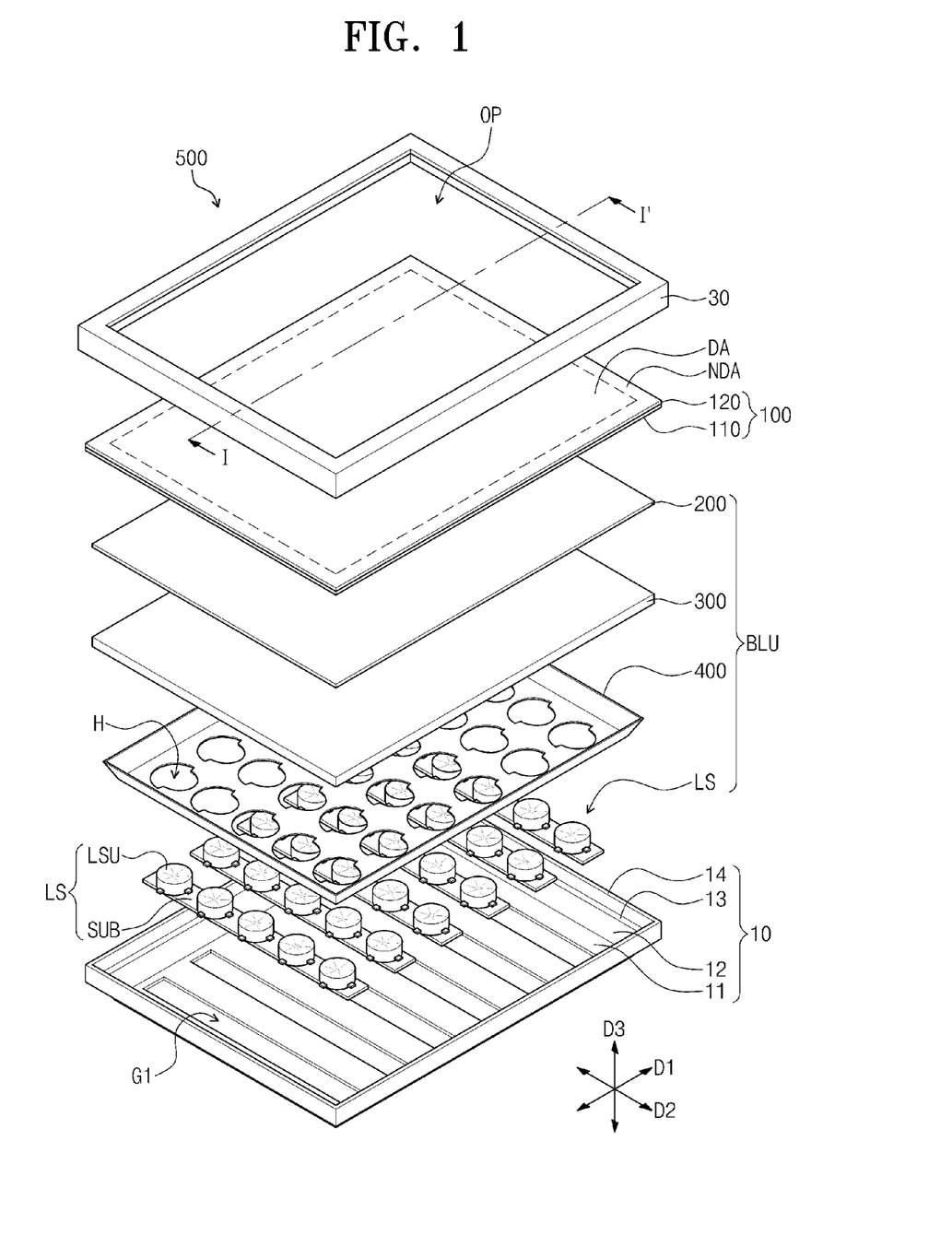
FIG. 1 is an exploded perspective view of an exemplary embodiment of a display apparatus according to the invention.

FIG. 1 is an exploded perspective view of an exemplary embodiment of a display apparatus according to the invention.

Referring to FIG. 1, an exemplary embodiment of a display apparatus 500 includes a long side elongated in a first direction D1 and a short side elongated in a second direction D2 crossing the first direction D1.

The display apparatus 500 includes a display panel 100, a backlight unit BLU, and protection members 10 and 30. The display panel 100, the backlight unit BLU, and the protection members 10 and 30 may each have a long side elongated in the first direction D1 and a short side elongated in the second direction D2.

The display panel 100 may be a liquid crystal display panel, an electrophoretic display panel or an electrowetting display panel.

According to an exemplary embodiment of the invention, the display panel 100 may be a liquid crystal display panel including a first display substrate 110, a second display substrate 120 facing the first display substrate 110, and a liquid crystal layer disposed between the first and second display substrates 110 and 120.

The display panel 100 has a planar area including a display area DA in which an image is displayed and a non-display area NDA in which an image is not displayed. The non-display area NDA may surround the display area DA. The display area DA and the non-display area NDA may together define an entire of the planar area of the display panel 100. Although not shown, a plurality of pixels which displays an image is disposed in the display area DA.

The backlight unit BLU may be disposed at a rear side of the display panel 100 to generate and provide light to the display panel 100. The pixels of the display panel 100 use light provided from the backlight unit BLU to display an image. The protection members 10 and 30 define a space which accommodates and protects therein the backlight unit BLU and the display panel 100.

The backlight unit BLU includes an optical sheet 200, a diffusion plate 300, a reflection sheet 400, and a light source LS provided in plural. The optical sheet 200, the diffusion plate 300 and the reflection sheet 400 may each have a long side elongated in the first direction D1 and a short side elongated in the second direction D2. The diffusion plate 300 has rigidity.

The optical sheet 200 is disposed at a rear side of the display panel 100. Although not shown, the optical sheet 200 may collectively include plural sheets such as a diffusion sheet, a prism sheet disposed on the diffusion sheet, and a protection sheet disposed on the prism sheet, but is not limited thereto.

The diffusion sheet may diffuse light provided from the diffusion plate 300. The prism sheet may collect light diffused by the diffusion sheet in a third direction D3 that is perpendicular to the plane of the display panel 100 (e.g., a plane defined in the first and second directions D1 and D2). The third direction D3 is a direction that is perpendicular to the first and second directions D1 and D2.

The light that has passed through the prism sheet vertically travels in an upward direction (e.g., the third direction D3) and toward the display panel 100. As a result, light having a uniform luminance distribution may be provided to the display panel 100. The protection sheet may protect the prism sheet that is vulnerable to scratches.

The diffusion plate 300 is disposed below the optical sheet 200. The diffusion plate 300 may include a dispersing agent distributed therein or a dispersing agent layer coated on a surface thereof. The diffusion plate 300 diffuses light provided from the light sources LS disposed at the rear side thereof to provide the diffused light to the optical sheet 200.

The reflection sheet 400 is disposed below the diffusion plate 300. The reflection sheet 400 includes defined therein a hole H provided in plural. Portions of the reflection sheet 400 define the holes H thereof. The light sources LS are disposed at a rear side of the reflection sheet 400. Lengths of the light sources LS extend in the second direction D2. The light sources LS are spaced equal distances apart from each other to be arranged in the first direction D1.

Each of the light sources LS includes a light source unit LSU which generates light and is provided in plural and a light source substrate SUB on which the plurality of light source units LSU are mounted. A length of the light source substrate SUB extends in the second direction D. Among the light sources LS spaced equal distances apart from each other to be arranged in the first direction D1, the light source substrates SUB are spaced equal distances apart from each other to be arranged in the first direction D1. The light source units LSU mounted on a same light source substrate SUB may be arranged at equal distances apart from each other to be arranged in the second direction D2 (e.g. along a length of the light source substrate SUB).

The light source units LSU may be light emitting diodes. Light generated from the light source units LSU is provided to the diffusion plate 300. Specific configurations of the light source units LSU will be described in detail below.

The holes H of the reflection sheet 400 are disposed to respectively correspond to the light source units LSU. The light source units LSU may extend into the holes H. The reflection sheet 400 may reflect light incident thereto from the light source units LSU in side and/or rear directions to provide the reflected light to the diffusion plate 300. Configuration in which the light source units LSU are disposed in the holes H of the reflection sheet 400 will be described below in detail.

The protection members 10 and 30 include a lower protection member 10 and an upper protection member 30. The lower protection member 10 may be a bottom chassis. The upper protection member 30 may be a top chassis. The lower protection member 10 is disposed at a rear side of the backlight unit BLU and accommodates the backlight unit BLU therein.

The lower protection member 10 includes a bottom portion 11, a first sidewall portion 12, a connection portion 13, and a second sidewall portion 14. The bottom portion 11 has a long side elongated in the first direction D1 and a short side elongated in the second direction D2. The lower protection member 10 defines each of the bottom portion 11, the first sidewall portion 12, the connection portion 13 and the second sidewall portion 14 thereof.

The bottom portion 11 includes defined therein a first groove G1 provided in plural and elongated in the second direction D2. Portions of the bottom portion 11 define the grooves G1. The first grooves G1 are spaced equal distances apart from each other to be arranged in the first direction D1. The light sources LS are disposed in corresponding first grooves G1, respectively, from among the first grooves G1. In detail, the light source substrate SUB respective light sources LS is received into a corresponding first groove G1 from among the first grooves G1.

The first sidewall portion 12 is connected to a boundary (e.g., edge) of the bottom portion 11. The first sidewall portion 12 defines an inclined surface that extends upward to form a predetermined angle with the bottom portion 11. The first sidewall portion 12 extended from the bottom portion 11 may have a top surface thereof disposed higher than the light sources LS. A distal end of the first sidewall portion 12 extended from the bottom portion 11 may be disposed further from a bottom of the first grooves G1 in the third direction than a top surface of the light sources LS.

The connection portion 13 is connected to a boundary (e.g., the distal end) of the first sidewall portion 12. The connection portion 13 extends in parallel to the bottom portion 11. The second sidewall portion 14 is connected to a boundary (e.g., edge) of the connection portion 13. The second sidewall portion 14 extends perpendicular to the connection portion 13 in the upward direction.

The upper protection member 30 is disposed on the top of the display panel 100. The upper protection member 30 includes defined therein an opening OP which exposes the display area DA of the display panel 100. Portions of the upper protection member 30 define the opening OP thereof.

A configuration in which the display panel 100 and the backlight unit BLU are accommodated in the lower and upper protection members 10 and 30 will be described below in detail.

Figure 2:
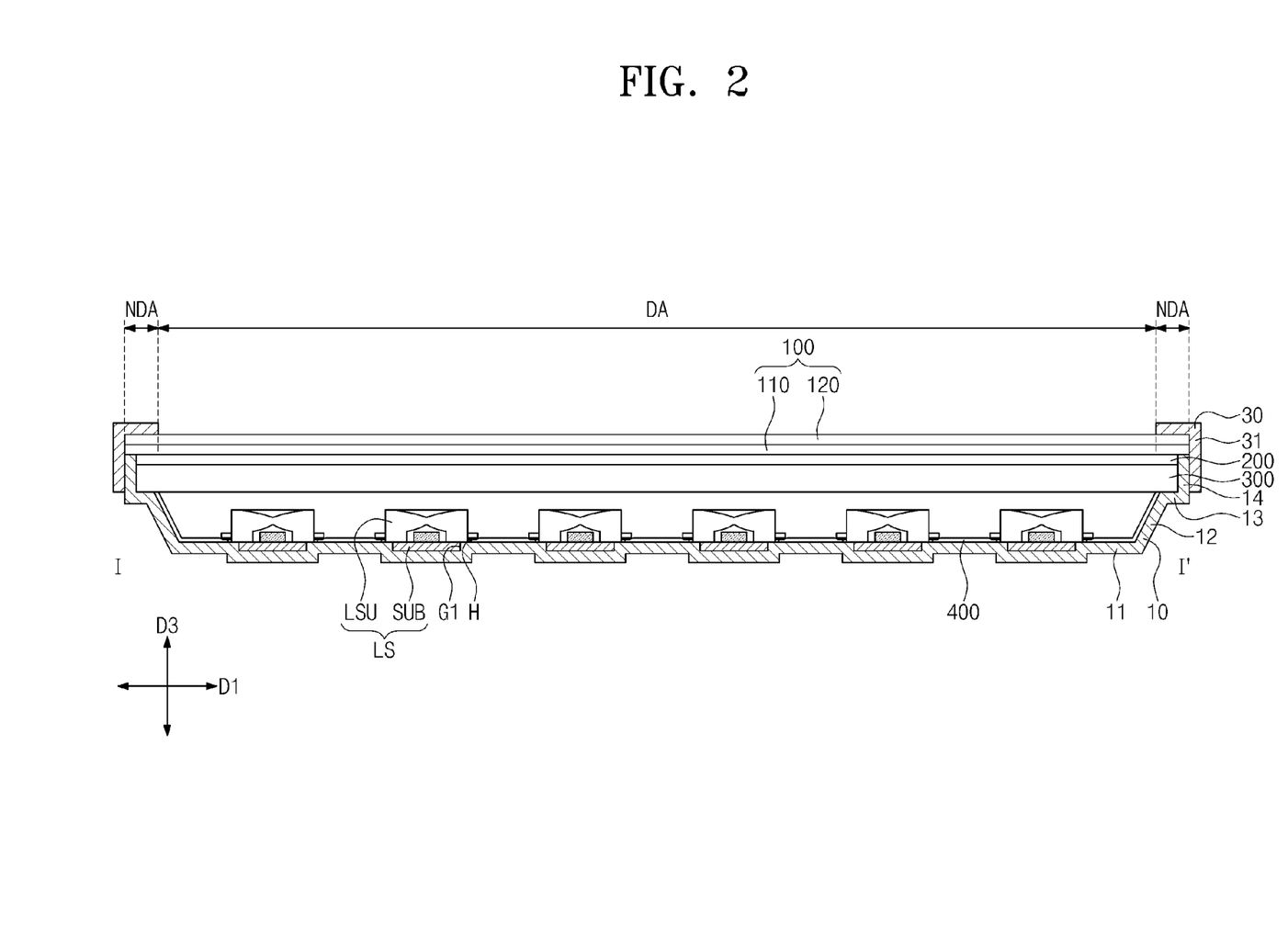
FIG. 2 is a cross-sectional view taken along line I-I' of FIG. 1.

FIG. 2 is a cross-sectional view taken along line I-I' of FIG. 1.

Referring to FIG. 2, the bottom portion 11 of the lower protection member 10 defines the plurality of first grooves G1 recessed downward from a top surface of the bottom portion 11. Such a configuration allows a bottom surface of the bottom portion 11 opposite to the top surface thereof that overlaps the first grooves G1 to protrude downward. As described above, the first grooves G1 are elongated to extend in the second direction D2 and are spaced equal distances apart from each other to be arranged in the first direction D1.

The light source substrates SUB are disposed into a corresponding first groove G1 from among the first grooves G1, respectively. The light source units LSU are mounted on the light source substrates SUB, respectively. In the third direction D3, the light source substrates SUB may have a thickness that is substantially the same as a depth of the first grooves G1. The depth of the first grooves G1 may be taken from the top surface of the bottom portion 11 to a bottom of the first grooves G1.

Description of the configuration of the first sidewall portion 12, the connection portion 13 and second sidewall portion 14 of the lower protection member 10 will not be further repeated because the description is provided above with reference to FIG. 1.

The light source units LSU are disposed into a corresponding hole H from among the holes H defined in the reflection sheet 400, respectively. The reflection sheet 400 is disposed to contact a top surface of the bottom portion 11 excluding portions of the bottom portion 11 at which the first grooves G1 are defined and to contact a top surface of the first sidewall portion 12. In the third direction D3, the reflection sheet 400 has a thickness that is less than that of the light source units LSU. A total thickness of the reflection sheet 400 is less than a total thickness of the light source units LSU taken from a common reference such as the top surface of the bottom portion 11 at which the first grooves G1 are not disposed.

A predetermined area of the reflection sheet 400, which is adjacent to and defines the holes H, may be fixedly coupled with protruding portions disposed on a side surface of the light source units LSU. Such a configuration will be described below in detail.

The diffusion plate 300 is disposed on the reflection sheet 400. The diffusion plate 300 is disposed on the connection portion 13. A predetermined area of a boundary of the diffusion plate 300 may contact a top surface of the connection portion 13. As a result, a predetermined space may be defined between the diffusion plate 300 and the bottom portion 11.

The optical sheet 200 may be disposed on the diffusion plate 300. The optical sheet 200 is relatively thin and has a flexible property, unlike the diffusion plate 300 that is relatively thick and has rigidity. The optical sheet 200 is disposed on the diffusion plate 300 having rigidity, so that the optical sheet 200 is not deformed such as being bent downward.

Side or end surfaces of the diffusion plate 300 and the optical sheet 200 may be disposed adjacent to an inner surface of the second sidewall portion 14. The optical sheet 200 may have a top surface at a same distance from the bottom portion 11 as a top surface of the second sidewall portion 14. The top surfaces of the optical sheet 200 and the second sidewall portion 14 may be coplanar with each other. The display panel 100 is disposed on the optical sheet 200 and the second sidewall portion 14.

The upper protection member 30 covers the non-display area NDA of the display panel 100. The display area DA of the display panel 100 is exposed by the opening OP defined by the upper protection member 30. The upper protection member 30 includes a third sidewall portion 31 extending along the third direction D3 from a top portion of the upper protection member 30 and disposed adjacent to an outer surface of the second sidewall portion 14 of the lower protection member 10.

Figure 3:
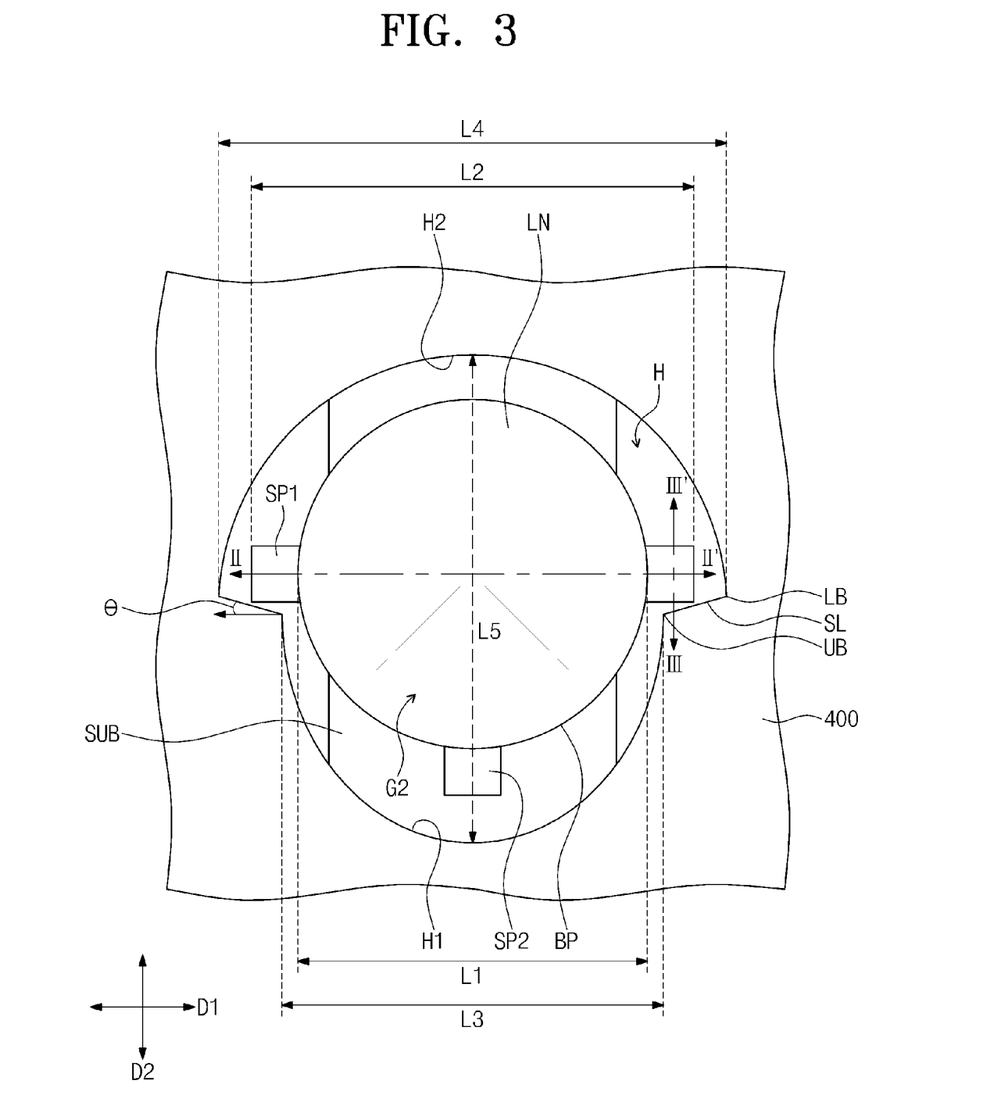
FIG. 3 is an enlarged top plan view illustrating an exemplary embodiment of a light source unit with respect to a hole of a reflection sheet according to the invention.
Figure 4:
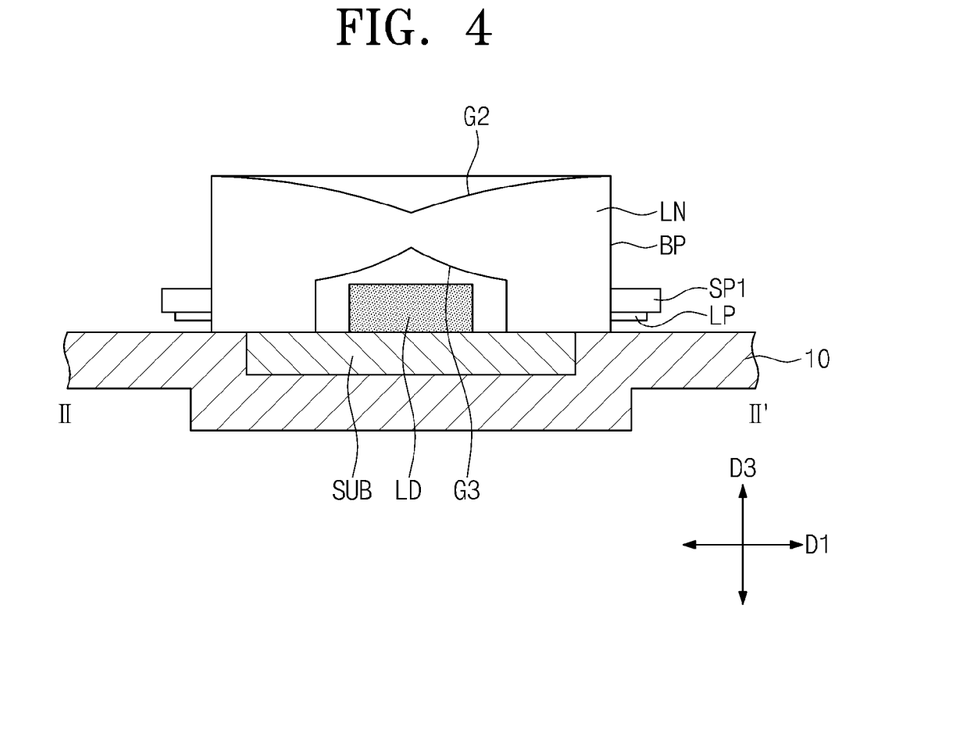
FIG. 4 is a cross-sectional view taken along line II-IF of FIG. 3.
Figure 5:
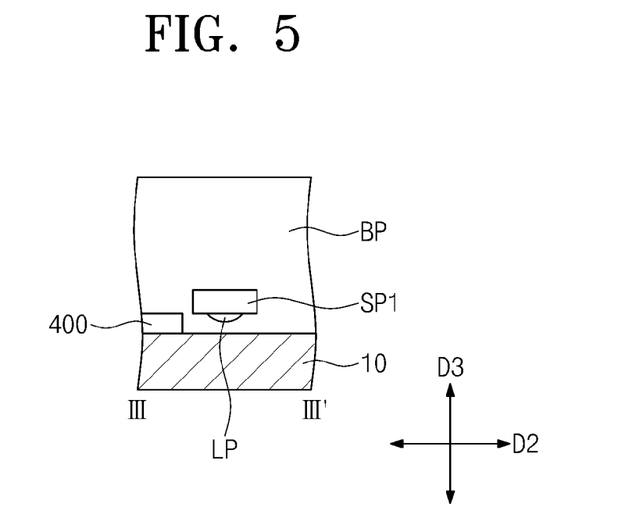
FIG. 5 is a cross-sectional view taken along line of FIG. 3.

FIG. 3 is an enlarged top plan view an exemplary embodiment of a light source units with respect to a hole of a reflection sheet according to the invention. FIG. 4 is a cross-sectional view taken along line II-IF of FIG. 3. FIG. 5 is a cross-sectional view taken along line of FIG. 3.

Light source units LSU and holes H of FIGS. 1 and 2 that are not illustrated in FIG. 3 have the same configuration as the light source unit and hole illustrated in FIG. 3.

Referring to FIGS. 3, 4 and 5, the light source unit LSU includes a light emitting device LD and a lens portion LN which is disposed on the light source substrate SUB. A portion of the lens portion LN of the light source unit LSU extends into the hole H of the reflection sheet 400.

The light emitting device LD generates light. Light generated from the light emitting device LD is diffused by the lens portion LN and outputted therefrom. The light emitting device LD is mounted on the light source substrate SUB. In an exemplary embodiment, for example, the light emitting device LD may be a light emitting diode generating white light.

The lens portion LN includes a body portion BP, a first side protruding portion SP1 disposed at each of opposing side surfaces of the body portion BP in the first direction D1 and each protruding from the body portion BP along the first direction D1, a second side protruding portion SP2 disposed at one side surface of the body portion BP in the second direction D2 from the first side protruding portions SP1 and protruding from the body portion BP in the second direction D2, and a lower protruding portion LP disposed below each of the first side protruding portions SP1 in the third direction D3 and protruding from the first side protruding portions SP1 in the downward direction. The body portion BP may define the first side protruding portions SP1, the second side protruding portion SP2 and the lower protruding portion LP.

A length of the light source substrate SUB is taken in the second direction D2 while a width of the light source substrate SUB is taken in the first direction D1. The lengths and widths are maximum dimensions of the light source substrate SUB in the second and first directions D2 and D1, respectively.

The body portion BP has a cylindrical shape in the top plan view. In the first direction D1, the body portion BP may have a maximum diameter that is greater than the width of the light source substrate SUB. In a cross-section, the body portion BP includes defined therein a second groove G2 recessed downward from a top surface of the body portion BP and a third groove G3 recessed upward from a bottom surface of the body portion BP. The body portion BP defines the second and third grooves G2 and G3.

The second groove G2 is recessed downward to have a cone shape in cross-section. The third groove G3 has a cylindrical shape at a lower portion thereof and a cone shape disposed at an upper portion thereof, that is, above a top of the cylindrical shape. That is, the third groove G3 has a shape in which the cylindrical shape and the cone shape are integrated with each other to form a continuous third groove G3. The light emitting device LD is disposed in the third groove G3.

The first side protruding portions SP1 may be respectively disposed at opposing side surfaces of the body portion BP in the first direction D1, respectively. In cross-section, the first and second side protruding portions SP1 and SP2 are spaced a predetermined distance from the bottom surface of the body portion BP in an upward direction. The first and second side protruding portions SP1 and SP2 have a rectangular shape in the top plan view.

The lower protruding portion LP is disposed below each of the first side protruding portions SP1. The lower protruding portions LP are elongated from the body portion BP to extend in the first direction D1. Also, as illustrated in FIG. 5, each of the lower protruding portions LP has a shape that is convex and defined extended in the second direction D2 and in a downward direction (e.g., along the third direction D3) when viewed from the first direction D1.

Referring to FIG. 5, the top of the reflection sheet 400 may be disposed at a same distance or a smaller distance from the lower protection member 10 than the bottom surfaces of the first side protruding portions SP1. Along the third direction D3, the distance between the bottom surfaces of the lower protruding portions LP and the top surface of the lower protection member 10 at which the first grooves G1 is not disposed is less than a total thickness of the reflection sheet 400.

In the first direction D1, the body portion BP of the lens portion LN defines a maximum diameter of a first length L1. In the first direction D1, a distance between distal ends of the first side protruding portions SP1 defines a second length L2. The second length L2 is greater than the first length L1.

The hole H is defined by edge portions of a first hole H1 recessed from the first side protruding portions SP1 along the second direction D2 to have a concave shape, edge portions of a second hole H2 recessed from the first hole H1 in a direction opposite to that of the first hole H1 to have a concave shape, and slanted edge portions SL connecting the first hole H1 to the second hole H2.

The first hole H1 and the second hole H2 face each other along the second direction D2, and a planar area of the second hole H2 is greater than that of the first hole H1. The slanted portions SL connect an upper portion of the first hole H1 to a lower portion of the second hole H2 with reference to the second direction D2.

In the second direction D2, a first (lower) side of the body portion BP and the second side protruding portion SP2 overlap with the first hole H1. In the second direction D2, a second (upper) side of the body portion BP opposite to the first side thereof overlaps with the second hole H2.

Upper boundary points UB of the first hole H1 are two points that initiate the concave recess in the second direction D2. Lower boundary points LB of the second hole H2 are two points that initiate the concave recess in the direction opposite to that of the concave recess of the first hole H1.

The distance between the upper boundary points UB of the first hole H1 defines a third length L3. The distance between the lower boundary points LB of the second hole H2 defines a fourth length L4. The third length L3 is greater than the first length L1. The second length L2 is larger than the third length L3. The fourth length L4 is larger than the third length L3.

The upper boundary points UB and the lower boundary points LB are spaced a predetermined distance from each other in the second direction D2. The slanted portions SL connect the upper boundary point UB of the first hole H1 and the respective adjacent lower boundary point LB of the second hole H2 to each other.

The slanted portion SL which connects the upper boundary point UB of the first hole H1 disposed on the left side of the hole H to the lower boundary point LB of the second hole H2 on the left side of the hole H in the first direction D1 and the slanted portion SL which connects the upper boundary UB of the first hole H1 disposed on the right side of the hole H to the lower boundary point LB of the second hole H2 on the right side of the hole H in the first direction D1 have structures symmetrical to each other.

Each of the slanted portions SL is inclined to form a predetermined angle θ with respect to the first direction D1. In an exemplary embodiment, for example, the slanted portion SL disposed on the left side of the hole H in the first direction D1 is inclined to define an angle θ that is greater than 0° and less than 30° with respect to a counterclockwise direction from the slanted portion SL and is elongated toward an upper left side from the first direction D1. Also, the slanted portion SL disposed on the right side of the hole H in the first direction D1 is inclined to define an angle θ that is greater than 0° and less than 30° with respect to a clockwise direction from the slanted portion SL and is elongated toward an upper right side from the first direction D1.

A fifth distance L5 is defined as a maximum dimension of the hole H in the second direction D2, such as between the lowest point of the first hole H1 at the lower side of the hole H in the second direction D2 and the highest point of the second hole H2 at the upper side of the hole H in the second direction D. The fifth distance L5 is larger than a maximum distance between a distal end of the second side protruding portion SP2 and an edge of the body portion BP in the second direction D2.

Figure 6:
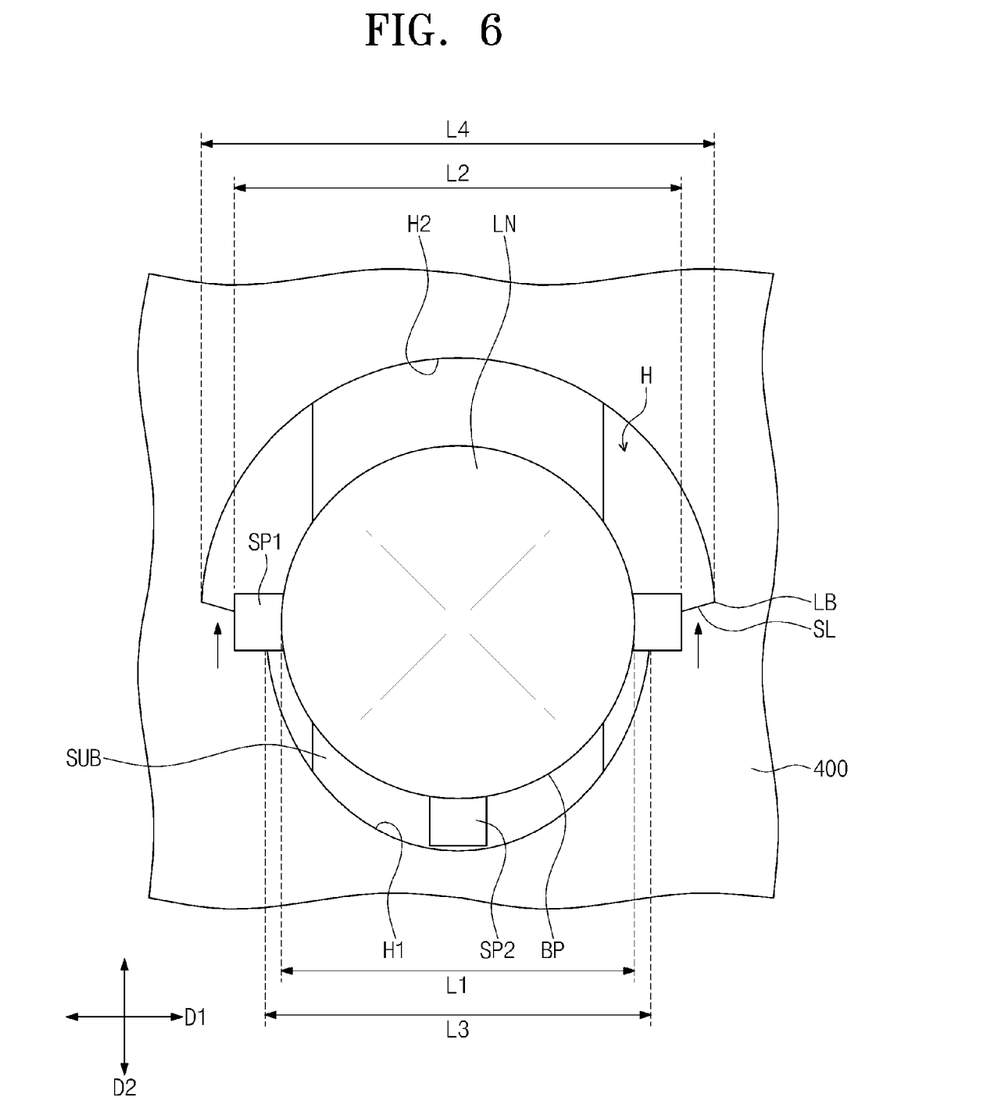
FIG. 6 is an enlarged top plan view and FIGS. 7 and 8 are cross-sectional views for describing an exemplary embodiment of a fixed state of a reflection sheet and a light source unit.
Figure 7:
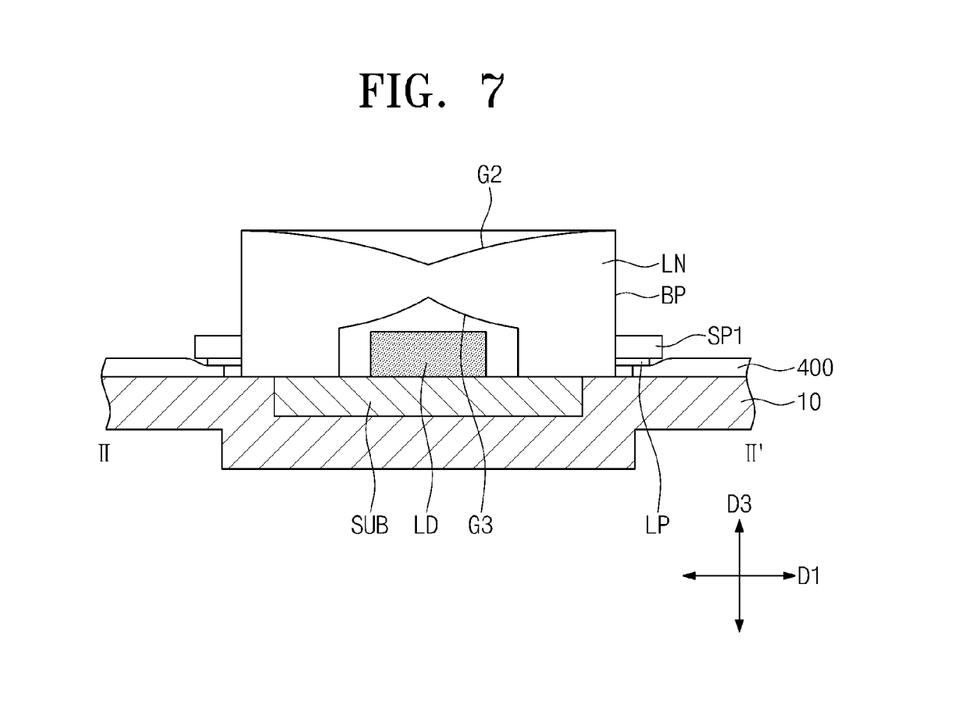
Figure 8:
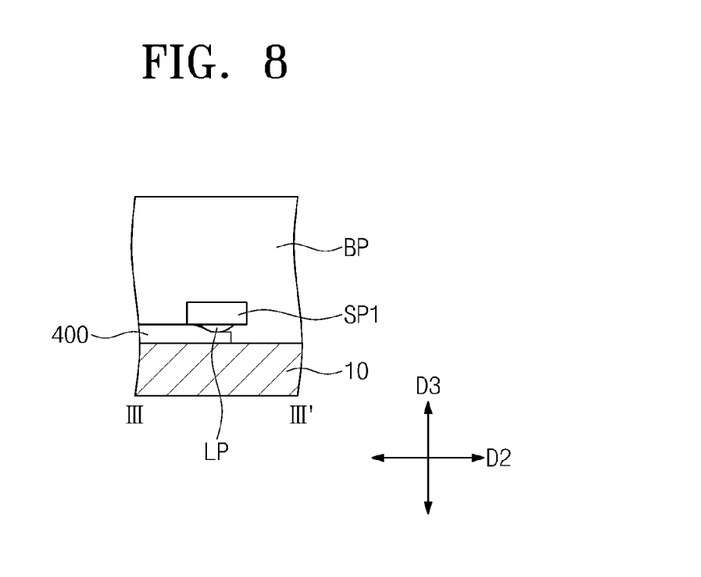

FIG. 6 is an enlarged top plan view and FIGS. 7 and 8 are cross-sectional views for describing an exemplary embodiment of a fixed state of a reflection sheet and a light source unit.

For convenience of description, FIG. 6 uses the light source unit LSU and hole H illustrated in FIG. 3. FIG. 7 is a cross-sectional view taken along line II-II' of FIG. 4. FIG. 8 is a cross-sectional view taken along line of FIG. 5.

Referring to FIGS. 3, 4 and 5, an unfixed state includes the lens portion LN of the light source unit LSU disposed into the hole H of the reflection sheet 400. Referring to FIGS. 6, 7 and 8, from the unfixed state in which the lens portion LN of the light source unit LSU is disposed into the hole H of the reflection sheet 400, the hole H of the reflection sheet 400 is transferred upward (indicated by the arrows) along the second direction D2 relative to the light source unit LSU. In detail, the hole H is transferred along the second direction D2 to dispose the slanted portions SL defining the hole H under and overlapping the lower protruding portions LP of the light source unit.

As illustrated in FIGS. 7 and 8, each of the slanted portions SL are disposed under a respective lower protruding portions LP to allow a predetermined area of the reflection sheet 400 adjacent to (e.g., defining) the slanted portions SL to overlap the lower protruding portions LP of the light source unit LSU. Accordingly, the predetermined area of the reflection sheet 400 adjacent to the slanted portions SL is disposed between the lower protruding portions LP of the light source unit LSU and the lower protection member 10 that overlaps the lower protruding portions LP.

In a conventional display apparatus, the lens portion may not include first side protruding portions and lower protruding portions, and a hole of a reflection sheet may have a circular shape. With such configuration, the lens portion is disposed into the hole of the reflection sheet, and the reflection sheet may be attached to a lower protection member by an adhesive member such as a double-sided tape. However, when an adhesion force of the double-sided tape is reduced as time elapses, detachment of the reflection sheet from the lower protection member may undesirably occur.

According to one or more exemplary embodiment of the invention, when the light source units LSU are displayed into the holes H of the reflection sheet 400, a predetermined area of the reflection sheet 400 that is adjacent to the slanted portions SL which define the holes H is engaged with lower portions of the first side protruding portions SP1 of each lens portion LN such that the reflection sheet 400 is fixedly attached to the lower protection member 10 without the use of a fixing member such as an adhesive member. The reflection sheet 400 is fixedly attached to the lower protection member 10 solely by engagement of the slanted portions SL which define the holes H with the lower protruding LP portions of the first side protruding portions SP1 of each lens portion LN. Thus, in one or more exemplary embodiment of the invention, detachment of the reflection sheet 400 from the lower protection member 10 may be reduced or effectively prevented.

As a result, in one or more exemplary embodiment of the display apparatus 500 according to the invention, detachment of the reflection sheet 400 from a protection member may be reduced or effectively prevented.

Figure 9A:
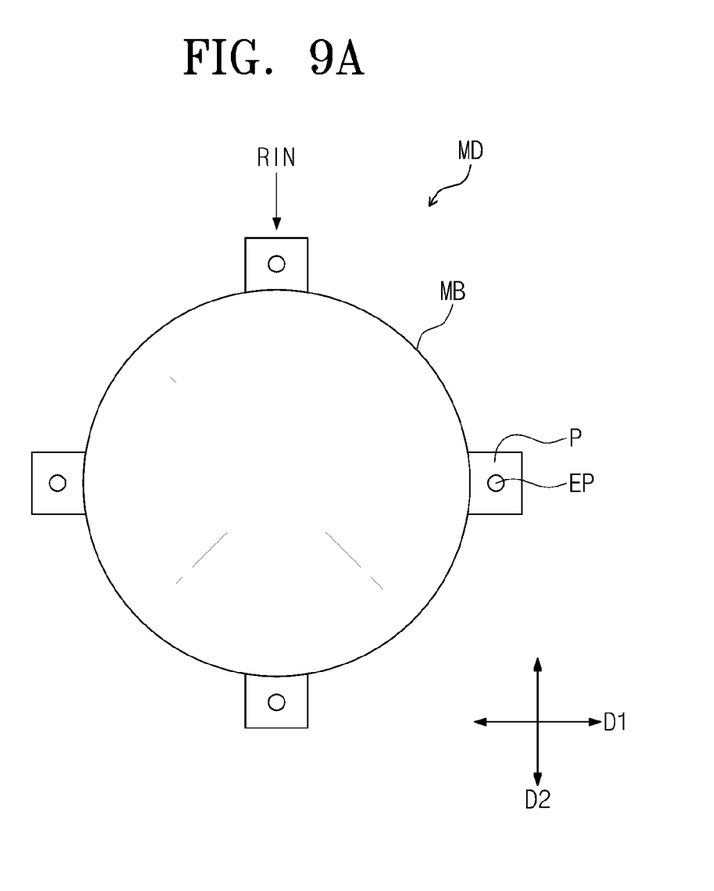
FIGS. 9A to 9C are views for schematically describing an exemplary embodiment of a method for manufacturing side protruding portions of a lens portion.
Figure 9B:
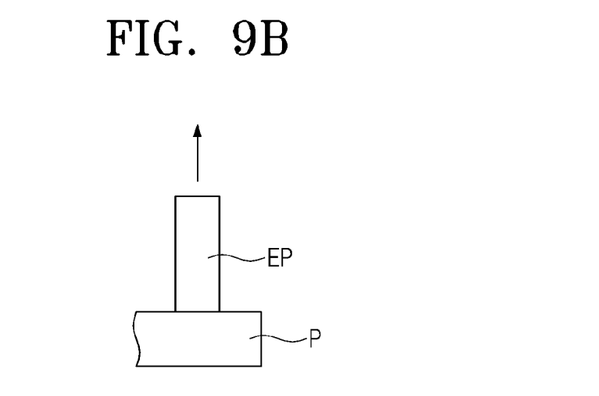
Figure 9C:
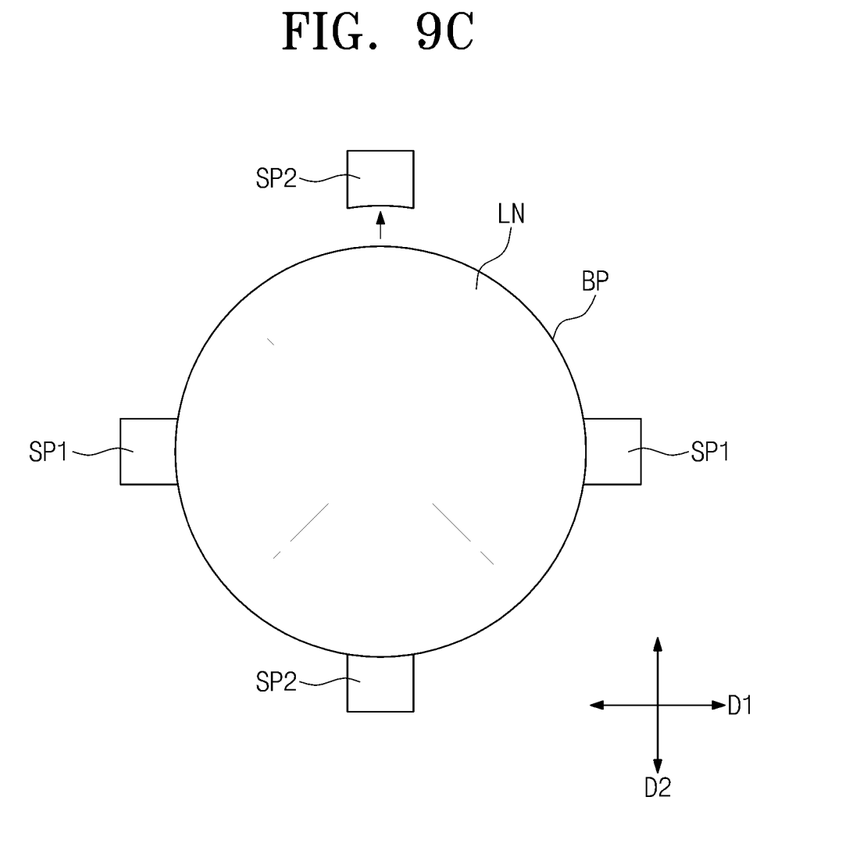

FIGS. 9A to 9C are views for schematically describing an exemplary embodiment of a method for manufacturing side protruding portions of a lens portion.

For convenience of description, FIG. 9B illustrates only a protruding portion P corresponding to one of the side protruding portions SP1 and SP2.

Referring to FIGS. 9A and 9B, a mold MD includes four protrusions P disposed extended from a side surface of a mold body MB in the first and second directions D1 and D2. As illustrated in the cross-sectional view of FIG. 9B, an elector pin EP is disposed at the top of the protrusions P. That is, four elector pins EP are used in manufacturing the lens portion. The mold MD is filled with resin RIN through a passage defined in any one of the protrusions P of the mold MD corresponding to the second side protruding portions SP2.

The mold body MB corresponds to a shape of the body portion BP of the lens portion LN, and the protrusions P correspond to shapes of the first and second side protruding portions SP1 and SP2. The resin RIN is hardened to form the body portion BP of the lens portion LN, first side protruding portions SP1 at respective opposing sides of the body portion BP in the first direction D1 and second side protruding portions SP2 at respective opposing sides of the body portion BP in the second direction D2. Thereafter, the elector pin EP is transferred upward to separate the mold MD from the formed lens portion LN.

With the elector pins, three point elector pins spaced at 120° or four point elector pins spaced at 90° with reference to a central portion of the mold body MB are used to remove the mold MD from the formed resin part through a uniform force in an upward direction. In an exemplary embodiment of the invention, the first side protruding portions SP1 should be disposed in parallel. Thus, the four elector pins EP are used Referring to FIG. 9C, among the formed second side protruding portions SP2, one of the second side protruding portion SP2 disposed at an upper portion of the formed body portion BP in the second direction D2 is separated from the formed body portion BP to be removed therefrom. An additional process may be required to remove the formed second side protruding portion SP2 disposed at the upper portion of the body portion BP in the second direction D2.

Although a formed second side protruding portion SP2 remains to omit the additional process for removing the second side protruding portion SP2 disposed at the lower portion of the body portion BP in the second direction D2, the invention is not limited thereto. Alternatively, the second side protruding portion SP2 disposed at the lower portion of the body portion BP in the second direction D2 may also be removed.

Figure 10:
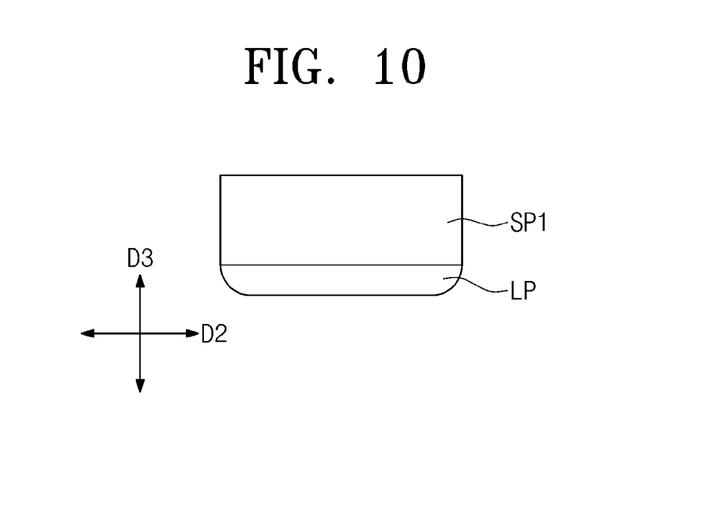
FIGS. 10 to 12 are cross-sectional views illustrating various exemplary embodiments of a lower protruding portion of a lens portion.
Figure 11:
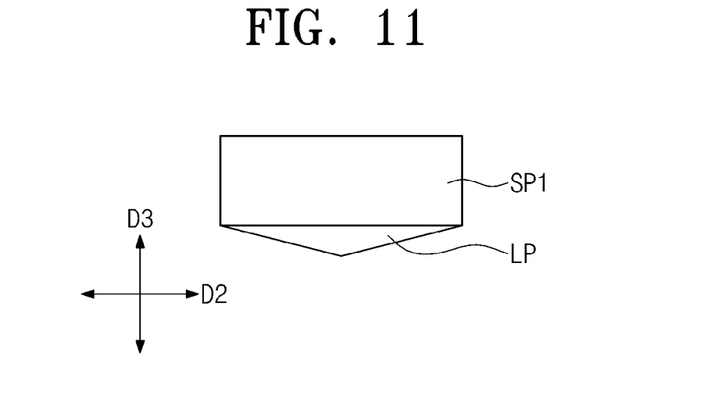
Figure 12:
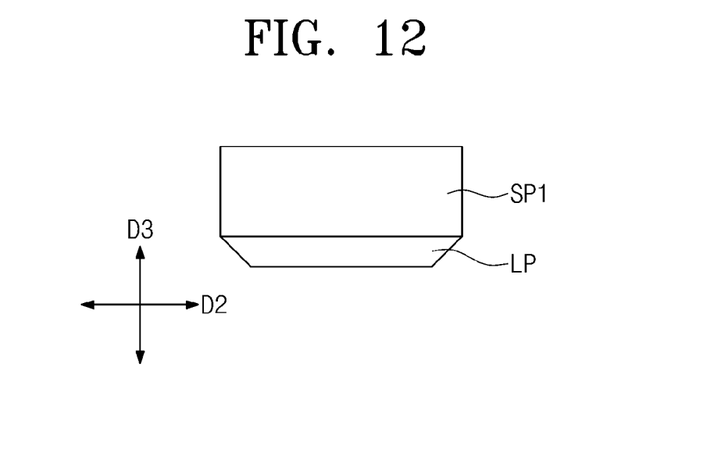

FIGS. 10 to 12 are cross-sectional views illustrating various exemplary embodiments of a lower protruding portion of a lens portion.

For convenience of description, FIGS. 10 to 12 illustrate shapes of the lower protruding portions LP when viewed from the first direction D1. The shapes are defined in the second and third directions D2 and D3.

Referring to FIG. 10, the shape of the lower protruding portion LP when viewed from the first direction D1 includes side surfaces connecting a flat bottom surface of the lower protruding portion LP and bottom surface of the first side protruding portion SP1 to each other. The side surfaces are disposed at opposing sides of the lower protruding portion LP in the second direction D2. The side surfaces may be curved or inclined with respect to the bottom surfaces of the lower protruding portion LP and the first side protruding portion SP1. A distance between the side surfaces of the lower protruding portion LP may be progressively reduced in a downward direction. The lower protruding portion LP may define side surfaces thereof having a convex curved shape.

Referring to FIGS. 11 and 12, the lower protruding portion LP may have a triangular or trapezoidal shape when viewed from the first direction D1.

Figure 13:
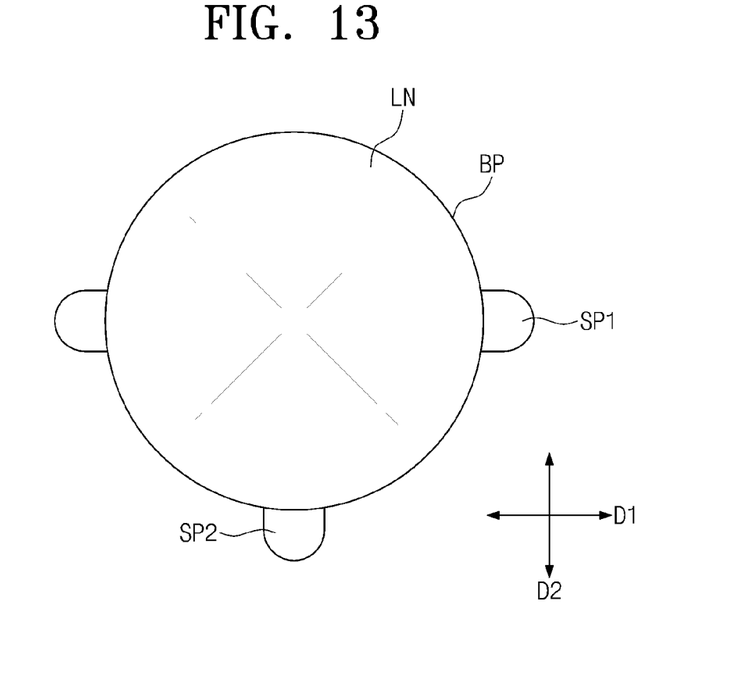
FIGS. 13 to 15 are top plan views illustrating various exemplary embodiments of a side protruding portion of a lens portion.
Figure 14:
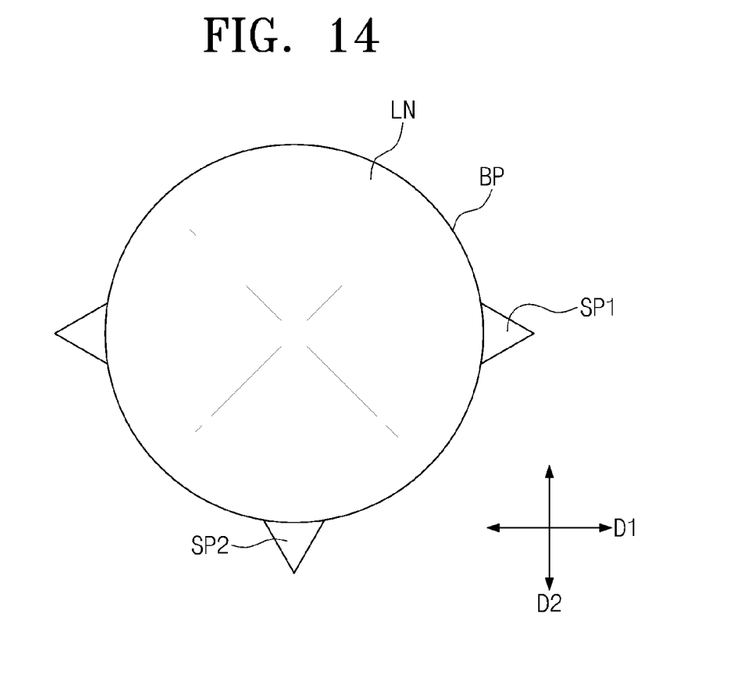
Figure 15:
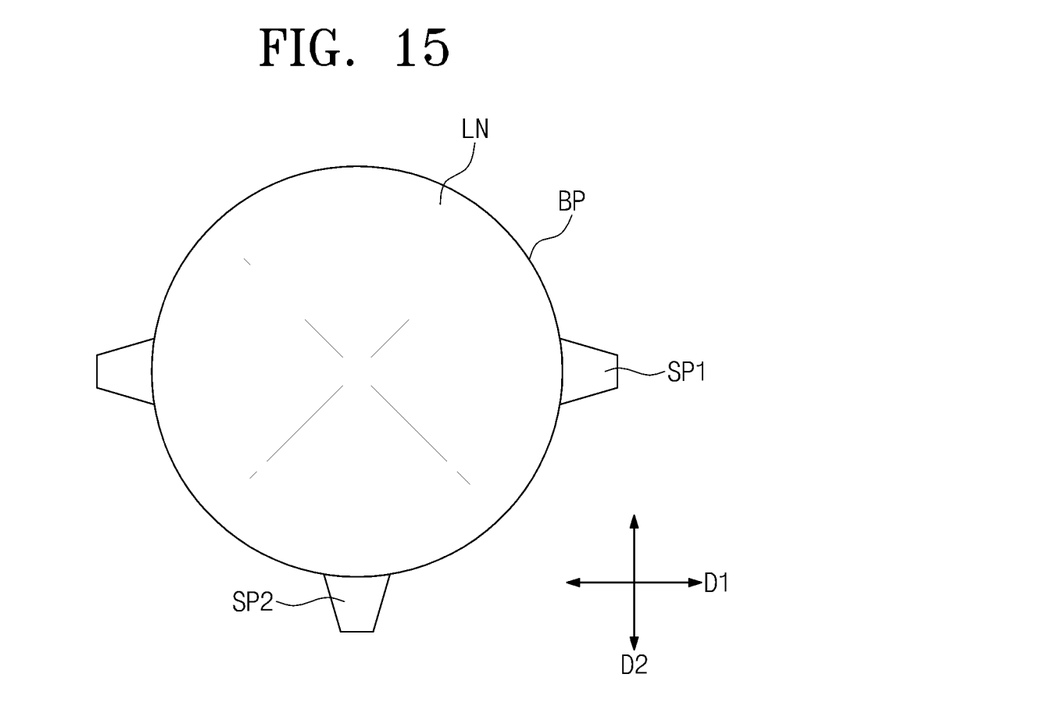

FIGS. 13 to 15 are top plan views illustrating various exemplary embodiments of a side protruding portion of a lens portion.

For convenience of description, FIGS. 13 to 15 illustrate a top view of the lens portion LN in which the lens portion LN is viewed from the top.

Referring to FIG. 13, in the first direction D1, the first side protruding portions SP1 each have a convex shape. Also, in the second direction D2, the second side protruding portion SP2 has a convex shape.

Referring to FIGS. 14 and 15, in the first direction D1, the first side protruding portions SP1 may each protrude from the body portion BP to have a triangular or trapezoidal shape. Also, in the second direction D2, the second side protruding portion SP2 may protrude from the body portion BP to have a triangular or trapezoidal shape.

According to one or more exemplary embodiment of the invention, when the light source units are respectively disposed into the holes of the reflection sheet, the display apparatus allows a predetermined area of the reflection sheet that is adjacent to the slanted portions of the holes to be fixedly engaged with the lower portion of the first side protruding portions of each of the lens portions, thereby disposing the reflection sheet between the lens portions and the lower protection member and thereby reducing or effectively preventing detachment of the reflection sheet from the lower protection member.

While descriptions of exemplary embodiments have been provided above, it will be apparent to those skilled in the art that various modifications and variations can be made in the invention. Thus, it is intended that the present disclosure covers the modifications and variations of this invention provided they come within the scope of the appended claims and their equivalents. Also, exemplary embodiments disclosed in the invention are not intended to limit the technical concept of the invention, and all technical concepts in the claims below and their equivalents are to be interpreted as being included in the scope of rights of the invention.

What is claimed is:

1. A display apparatus, comprising:
   a light source unit provided in plural and comprising a light emitting device which generates light and a lens portion which is on the light emitting device and emits the light;
   a reflection sheet defining a hole thereof provided in plural and in which the light source unit is disposed; and
   a display panel which is disposed on the reflection sheet and displays an image with the light emitted by the light source unit,
   wherein
   the lens portion defines:
     a body portion thereof on the light emitting device; and
     a first side protruding portion thereof provided in plural and respectively disposed at opposing sides of the body portion in a first direction to protrude from the body portion along the first direction in a top plan view,
   the hole of the reflection sheet is defined by:
     an edge of a first hole;
     an edge of a second hole facing the first hole in a second direction crossing the first direction, the second hole larger than the first hole; and
     slanted edges which connect an upper portion of the first hole to a lower portion of the second hole, and
   in a fixed state of the reflection sheet, a predetermined area of the reflection sheet which is adjacent to the slanted edges overlaps the first side protruding portions of the lens portion.

2. The display apparatus of claim 1, wherein the lens portion further defines:
   a lower protruding portion thereof respectively disposed below each of the first side protruding portions and protruding toward the reflection sheet; and
   a second side protruding portion thereof protruding from the body portion along the second direction in the top plan view.

3. The display apparatus of claim 2, wherein in the fixed state of the reflection sheet, the predetermined area of the reflection sheet which is adjacent to the slanted edges overlaps the lower protruding portions of the lens portion.

4. The display apparatus of claim 2, wherein the first and second side protruding portions are each spaced a predetermined distance from a bottom surface of the body portion in a third direction perpendicular to both the first and second directions.

5. The display apparatus of claim 2, wherein the lower protruding portions are each elongated in the first direction and have a convex shape defined in the second direction and a third direction perpendicular to both the first and second directions.

6. The display apparatus of claim 2, wherein the first and second side protruding portions have a rectangular shape in the top plan view.

7. The display apparatus of claim 2, further comprising:
   a light source substrate provided in plural and on which the light source units are mounted, the light source substrates elongated in the second direction and spaced apart from each other in the first direction; and
   a lower protection member defining a plurality of first grooves into which the light source substrates are disposed,
   wherein in the fixed state of the reflection sheet, the predetermined area of the reflection sheet which is adjacent to the slanted edges is disposed between the lower protruding portions of the lens portions and portions of the lower protection member which overlap the lower protruding portions in the top plan view.

8. The display apparatus of claim 7, wherein
the lower protection member defines:
    a bottom portion thereof defining a top surface thereof from which the plurality of first grooves are recessed, and
    a sidewall portion extended from edges of the bottom portion,
from the top surface of the bottom portion of the lower protection member, a height of a top surface of the reflection sheet is equal to or less than that of a bottom surface of the first side protruding portions, and
a distance between a bottom surface of the lower protruding portions and the top surface of the bottom portion of the lower protection member is less than a total thickness of the reflection sheet.

9. The display apparatus of claim 7, wherein
the body portion has a circular shape in the top plan view,
a width of the light source substrate is defined in the first direction,
a maximum diameter of the body portion defines a first length in the first direction,
a distance between distal ends of the first side protruding portion defines a second length in the first direction,
the second length is greater than the first length, and
the first length is greater than the width of the light source substrate in the first direction.

10. The display apparatus of claim 9, wherein
the edge of the first hole defines a concave shape protruded along the second direction, and
the edge of the second hole defines a concave shape protruded along the second direction in a direction opposite to that of the concave shape of the first hole.

11. The display apparatus of claim 10, wherein in a un-fixed state of the reflection sheet,
in the second direction in the top plan view,
    a lower side of the body portion and the second side protruding portion overlaps the first hole, and
    an upper side of the body portion opposite to the lower side thereof overlaps the second hole.

12. The display apparatus of claim 10, wherein in the top plan view,
    the concave shape of the edge of the first hole is protruded from upper boundary points thereof disposed spaced apart from each other in the first direction, and a distance between the upper boundary points of the first hole defines a third length in the first direction,
    the concave shape of the edge of the second hole is protruded from lower boundary points thereof disposed spaced apart from each other in the first direction, and a distance between the lower boundary points of the second hole defines a fourth length in the first direction, and
    the third length is greater than the first length, the second length is greater than the third length, and the fourth length is greater than the third length.

13. The display apparatus of claim 12, wherein
the upper boundary points of the first hole and the lower boundary points of the second hole are spaced a predetermined distance in the second direction, and
the slanted edges respectively connect an upper boundary point among the upper boundary points of the first hole to a lower boundary point among the lower boundary points of the second hole which are adjacent to each other.

14. The display apparatus of claim 13, wherein the slanted edges which respectively connect the upper boundary points of the first hole to the lower boundary points of the second hole are spaced apart from each other in the first direction and are symmetric to each other in the first direction.

15. The display apparatus of claim 14, wherein each of the slanted edges is inclined to form a predetermined angle with respect to the first direction.

16. The display apparatus of claim 15, wherein in the plan view, among the slanted edges which respectively connect the upper boundary points of the first hole to the lower boundary points of the second hole and are spaced apart from each other in the first direction,
    a first slanted edge disposed on the left side of the hole is inclined to form an angle greater than about 0° and less than about 30° in a counterclockwise direction from the first slanted edge to the first direction, and
    a second slanted edge disposed on the right side of the hole is inclined surface to form an angle greater than about 0° and less than about 30° in a clockwise direction from the second slanted edge to the first direction.

17. The display apparatus of claim 10, wherein
a maximum dimension of the hole in the second direction defines a fifth length, and
the fifth length is greater than a maximum distance between a distal end of the second side protruding portion and an outer edge of the body portion in the second direction.

18. The display apparatus of claim 2, wherein
the lower protruding portions are each elongated in the first direction and have a convex shape defined in the second direction and a third direction perpendicular to both the first and second directions, and
the convex shape is defined by a flat bottom surface extending in the second direction and curved side surfaces, a flat bottom surface extending in the second direction and inclined side surfaces forming a trapezoidal shape, or inclined surfaces forming a triangular shape.

19. The display apparatus of claim 2, wherein in the top plan view,
the first side protruding portions are each elongated in the first direction and edges thereof define a curved convex, a triangular or a trapezoidal shape extended in the first direction, and
the second side protruding portion is elongated in the second direction and edges thereof define a curved convex, a triangular or a trapezoidal shape extended in the second direction.

* * * * *